United States Patent
Laurent

(10) Patent No.: US 10,417,438 B2
(45) Date of Patent: Sep. 17, 2019

(54) COMPUTER SYSTEM OF SECURE DIGITAL INFORMATION MANAGING

(71) Applicant: DOCAPOST DPS, Charenton le Pont (FR)

(72) Inventor: Antoine Laurent, Nantes (FR)

(73) Assignee: DOCAPOST DPS, Charenton le Pont (FR)

( * ) Notice: Subject to any disclaimer, the term of this patent is extended or adjusted under 35 U.S.C. 154(b) by 79 days.

(21) Appl. No.: 15/250,161

(22) Filed: Aug. 29, 2016

(65) Prior Publication Data

US 2017/0068824 A1 Mar. 9, 2017

(30) Foreign Application Priority Data

Sep. 7, 2015 (FR) ...................................... 15 58289

(51) Int. Cl.
  *G06F 21/62* (2013.01)
  *G06F 21/55* (2013.01)
  *G06F 21/50* (2013.01)

(52) U.S. Cl.
  CPC .......... *G06F 21/6218* (2013.01); *G06F 21/50* (2013.01); *G06F 21/552* (2013.01); *G06F 2221/034* (2013.01)

(58) Field of Classification Search
  CPC ........ G06F 21/00; G06F 21/10; G06F 21/121; G06F 21/50; G06F 21/552; G06F 21/6218; G06F 2221/034; G06F 21/55; H04N 21/44236; G11B 20/00086; G06Q 10/06
  USPC ......................................................... 726/26
  See application file for complete search history.

(56) References Cited

U.S. PATENT DOCUMENTS

| | | | | |
|---|---|---|---|---|
| 5,740,432 A | * | 4/1998 | Mastors | ............. G06F 11/1443 |
| 5,828,882 A | * | 10/1998 | Hinckley | ............... G06F 9/542 |
| | | | | 719/318 |
| 6,952,471 B1 | * | 10/2005 | Cannon | ............ H04M 1/72502 |
| | | | | 379/388.01 |
| 8,341,123 B2 | * | 12/2012 | Irving | ............... G06F 17/30115 |
| | | | | 707/648 |
| 2006/0218541 A1 | * | 9/2006 | Saito | ................... G06F 9/44521 |
| | | | | 717/146 |
| 2006/0279628 A1 | * | 12/2006 | Fleming | ............... G11B 27/034 |
| | | | | 348/143 |

(Continued)

OTHER PUBLICATIONS

International Search Report for FR1558289, dated Jul. 22, 2016.

*Primary Examiner* — Kaveh Abrishamkar
(74) *Attorney, Agent, or Firm* — B. Aaron Schulman, Esq.; Stites & Harbison, PLLC

(57) ABSTRACT

The present invention relates to a computer system (10) for the secure management of digital information implementing probative value traceability of that digital information, the system in particular being usable in the field of digital archiving, and comprising information production means (12), information preservation means (14), information distribution and consumption means (16) and means (18) for the traceability of digital information including a log (24) of events relative to digital information and detection means (22), to record that event in the event log (24).

The detection means (22) are further able to detect each event relative to each item of digital information during the production thereof and during the distribution or consumption thereof, to record that event in the event log (24) that is shared between these different means.

8 Claims, 1 Drawing Sheet

(56) References Cited

U.S. PATENT DOCUMENTS

| | | |
|---|---|---|
| 2009/0158441 A1 | 6/2009 | Mohler et al. |
| 2009/0271580 A1 | 10/2009 | Oe et al. |
| 2011/0107408 A1* | 5/2011 | Blot-Lefevre .......... G06F 21/46 |
| | | 726/7 |
| 2011/0254731 A1* | 10/2011 | Musmeci .............. G01S 5/0027 |
| | | 342/357.25 |
| 2012/0137367 A1* | 5/2012 | Dupont ................... G06F 21/00 |
| | | 726/25 |
| 2014/0023264 A1* | 1/2014 | Branch .................... G06K 9/78 |
| | | 382/141 |
| 2014/0058982 A1* | 2/2014 | Loui ....................... G10L 25/51 |
| | | 706/12 |
| 2014/0195485 A1* | 7/2014 | Dorman ............ G06F 17/30144 |
| | | 707/624 |
| 2015/0235152 A1 | 8/2015 | Eldardiry et al. |
| 2015/0261389 A1* | 9/2015 | Abate ................... G06F 3/0481 |
| | | 715/741 |
| 2016/0232024 A1* | 8/2016 | Hamilton, II ....... G06F 9/45558 |
| 2016/0359659 A1* | 12/2016 | MacGougan ....... H04L 41/0672 |
| 2017/0142152 A1* | 5/2017 | Hamilton, II ....... H04L 63/1441 |

* cited by examiner

COMPUTER SYSTEM OF SECURE DIGITAL INFORMATION MANAGING

The present invention relates to a computer system for the secure management of digital information usable in the digital archiving field.

In particular, the invention relates to such a computer system for the secure management of digital information implementing the probative value traceability of that digital information.

Such a system comprises:
means for producing digital information;
means for preserving digital information;
means for distributing and consuming digital information;
means for the traceability of digital information including a log of events relative to digital information and detection means able to detect each event relative to each item of digital information preserved in the preservation means, to record that event in the event log.

It is known in the state of the art to use computer systems for the secure management of digital information making it possible to carry out probative value traceability of that digital information.

In particular, these systems provide the secure management of digital information during different phases in the life of that information, in particular, comprising a production phase, a preservation phase, and a consumption phase.

All of these phases as a unit then form a lifecycle of the corresponding digital information.

The management system further makes it possible to securely preserve the digital information and to trace any event relative to the preserved digital information.

Each item of digital information, for example, assumes the form of an electronic document or any other computer file whereof long-term preservation is necessary.

One can then see that computer management systems are in particular applicable in the field of the digital archiving of electronic documents.

Thus, each event relative to an electronic document for example comprises opening, modifying, duplicating, or deleting that electronic document.

The traceability of the digital information provided by these systems must satisfy one or several normative texts, which in particular include AFNOR Z42013, AFNOR Z42019, MOREQ 1, 2 and 2010, OAIS, ISO 30300, ISO 30301 and ISO 27001.

In particular, normative text AFNOR Z42013 is applicable to the preservation of digital information with probative value.

This text stipulates that in order for any event relative to an item of digital information to be enforceable, it must be recorded in an event log provided to that end and stored in a secure form.

This event log is associated with traceability means that make it possible to capture each event automatically relative to each item of digital information stored in the preservation means and to describe that event in the event log.

The description of an event comprises all types of additional information relative to that event, for example information on the author of the event, its date, how it is executed, its reasons, the number of repetitions, etc.

However, the existing computer systems for secure management are not completely satisfactory.

More particularly, these systems do not make it possible to trace the events relative to the digital information throughout the entire lifecycle of that information.

Indeed, some of these systems only make it possible to trace the events relative to the digital information during the preservation phase of that digital information.

Other computer systems for secure management further provide the traceability of the digital information for example during the production phase of that information, but do not make it possible to have a complete view of all of the events having occurred during the complete lifecycle of that information.

The present invention aims to propose a computer system for the secure management of digital information resolving the aforementioned drawbacks.

To that end, the invention relates to a computer system for the secure management of digital information in which the detection means are further able to detect each event relative to each item of digital information during the production thereof by the production means and during the distribution or consumption thereof by the distribution and consumption means, to record that event in the event log that is shared between the production means, the preservation means and the distribution and consumption means.

According to other advantageous aspects of the invention, the computer system for secure management comprises one or more of the following features, considered alone or according to all technically possible combinations:
the detection means are able to record each event in the event log in a record format shared by all of the events;
the traceability means further include a securing module making it possible to secure the event log;
the securing module is able to present the event log in the form of a sequence of computer files, each following computer file comprising a header including an imprint of a preceding computer file and a body including records corresponding to at least certain events detected by the detection means;
each event is chosen from the group including at least the creation of an item of digital information, the modification of an item of digital information, the deletion of an item of digital information, the duplication of an item of digital information, the distribution of an item of digital information, and the consultation of an item of digital information;
the detection means assume the form of three independent detection modules integrated into the production means, the preservation means and the distribution and consumption means;
the detection means assume the form of a detection module independent of the production means, the preservation means and the distribution and consumption means;
the or each detection module is made in the form of a software program; and
each item of digital information comprises an electronic document.

These features and advantages of the invention will appear upon reading the following description, provided solely as a non-limiting example, and done in reference to the appended drawings, in which:

FIG. 1 shows a computer system for the secure management of digital information according to the invention.

Figure 1:
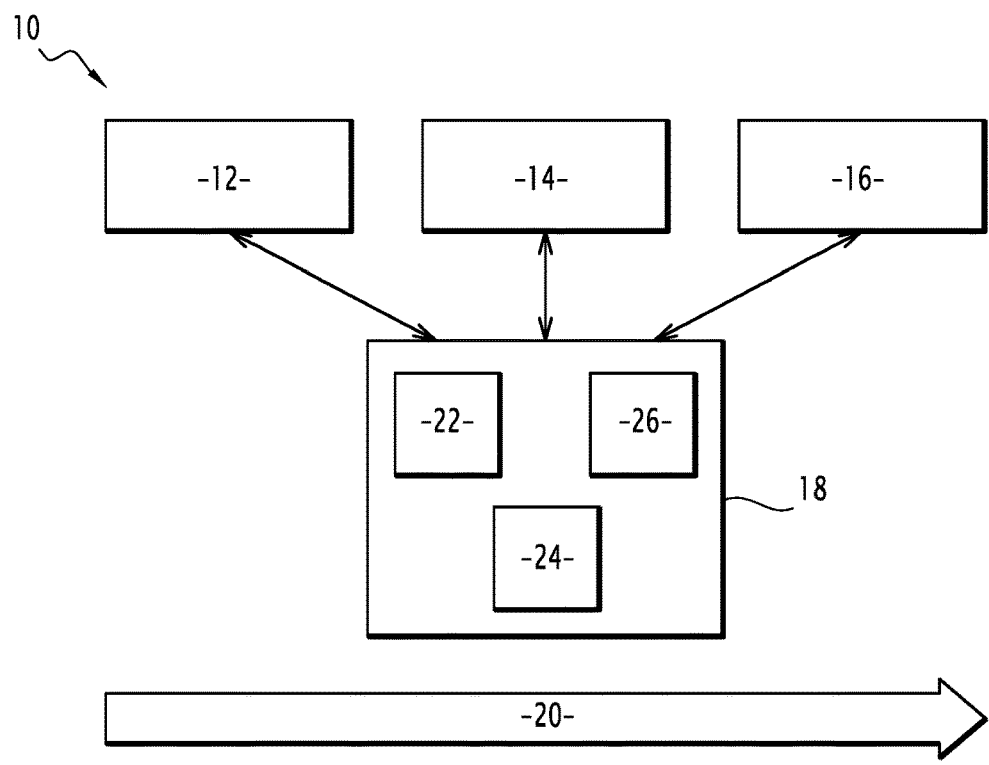
FIG. 1 is a diagrammatic view of a computer system for the secure management of digital information according to the invention, the system in particular including an event log.

This system is designated by general reference 10 in FIG. 1.

The system 10 is in particular usable in the field of the digital archiving of electronic documents.

Thus, according to this example application, each item of digital information comprises an electronic document.

The system 10 comprises digital information production means, digital information preservation means, digital information distribution and consumption means, and digital information traceability means.

These different means are designated by general references 12, 14, 16 and 18, respectively, in FIG. 1.

The production means 12 make it possible to generate digital information in a manner known in itself in the state of the art.

In the field of digital archiving, these production means 12 for example comprise a computer able to receive the digital data to be archived and to form an archive to be stored from that data.

The preservation means 14 for example comprise one or several servers that are connected and able to store digital information securely.

This information is for example stored redundantly with limited access controlled by securing means set out to that end.

The distribution and consumption means 16 make it possible to extract digital information kept in the preservation means 14, to send that information to a user or to use it for other predetermined purposes.

Thus, for example, in the field of digital archiving, these means 16 form a communication interface with the user in particular making it possible to consult the preserved archives.

One can then see that the production means 12, the preservation means 14 and the distribution and consumption means 16 manage the digital information during the complete lifecycle of that information.

The lifecycle of each item of digital information is diagrammatically illustrated by an arrow 20 in FIG. 1, and in particular comprises a production phase carried out by the production means 12, a preservation phase carried out by the preservation means 14 and a consumption phase carried out by the distribution and consumption means 16.

Furthermore, the production means 12, the preservation means 14 and the distribution and consumption means 16 are for example heterogeneous means, located in separate geographic locations and implemented using different technologies.

The traceability means 18 include means for detecting events relative to each item of digital information, a log of these events and a module for securing the log.

These different components of the traceability means 18 are designated by general references 22, 24 and 26, respectively, in FIG. 1.

"Event" thus refers to any action performed by a user or by a computer system on an item of digital information.

Thus, for example, each event is chosen from the group including at least:
creation of an item of digital information;
modification of an item of digital information;
deletion of an item of digital information;
duplication of an item of digital information;
distribution of an item of digital information; and
consultation of an item of digital information.

In the example of FIG. 1, the detection means 22 assume the form of a detection module 22 independent of the production means 12, the preservation means 14 and the distribution and consumption means 16.

Alternatively, the detection means 22 assume the form of three independent detection modules integrated into the production means 12, the preservation means 14 and the distribution and consumption means 16. Each of these detection modules is analogous to the detection module 22 of FIG. 1.

The detection module 22 is able to detect each event relative to an item of digital information during each of the phases of the lifecycle of that item of digital information.

In particular, the detection module 22 is able to detect each event relative to that item of digital information during the production thereof by the production means 12, the preservation thereof by the preservation means 14, and the distribution or consumption thereof by the distribution and consumption means 16.

The detection module 22 is for example made in the form of a software program implemented independently of the digital information production means 12, preservation means 14 and distribution and consumption means 16.

The detection module 22 is further able to record each detected event in the event log 24 in a record format shared by all of the events.

Additionally, the detection module 22 is able to record metadata accompanying each event in the log 24.

This metadata for example comprises the date of the event, the identifier of the author of the event, the number of repetitions, etc.

Thus, the event log 24 is shared between the means 12, 14 and 16 and makes it possible to record all of the events having occurred in those means using a shared record format.

The securing module 26 makes it possible to secure the event log 24 using a securing technology for example according to a normative text such as AFNOR Z42013.

Figure 2:
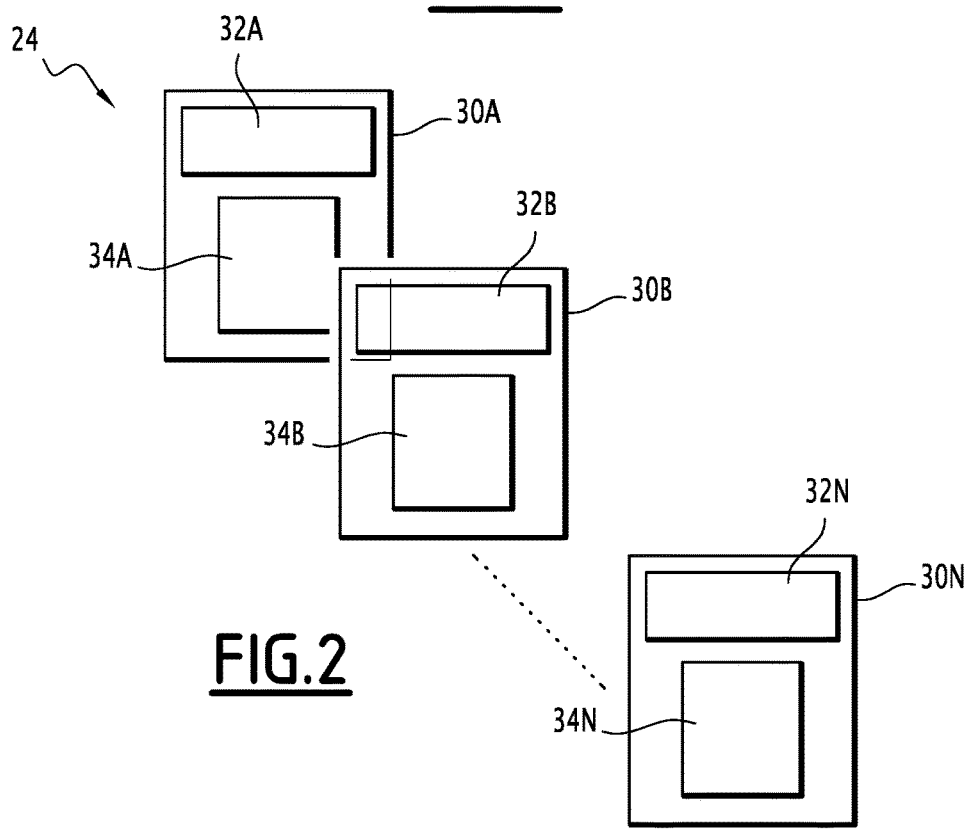
FIG. 2 is a diagrammatic view of the event log of FIG. 1.

The event log 24 in secure form implemented by the securing module 26 is diagrammatically illustrated in FIG. 2.

Thus, in reference to this figure, the event log 24 is shown in the form of a sequence of computer files designated by general references 30A to 30N.

Each computer file 30A to 30N comprises a header 32A to 34N and a body 34A to 34N.

The header 32A to 32N of each following computer file 30A to 30N includes an imprint of the preceding computer file 30A to 30N in the sequence.

Each imprint is for example made using an encoding technique known in itself.

The body 34A to 34N of each computer file 30A to 30N includes records corresponding to at least certain events detected by the detection module 22, for example in a chronological order of those events.

Thus, in the example of FIG. 2, the header 32B of the computer file 30B includes an imprint of the computer file 30A.

The files 30A to 30N thus form a continuous set, which makes it possible to avoid any illegitimate modification of the event log 24, for example a deletion or addition of an unauthorized record.

The operation of the system 10 will now be explained.

Thus, during each of the phases in the lifetime of an item of digital information, the detection module 24 detects each event relative to that item of digital information.

Then, the detection module 22 records each detected event in the log 26 in the secure form.

To do this, the detection module 22 sends the corresponding record, optionally with associated metadata, to the securing module 26, which adds a new record in the last file in the sequence of existing files 30A to 30N or creates a new file in that sequence for that recording.

Of course, other example embodiments of the invention are also possible.

One can then see that the present invention includes a certain number of advantages.

In particular, the system according to the invention makes it possible to trace each event relative to each item of digital information during each of the phases of the lifetime of that item of information.

The detection and recording of these events is done in a centralized manner by independent detection means.

This then makes it possible to obtain a complete picture of all of the events relative to a given item of digital information.

Furthermore, each event is recorded using a unique format, which avoids the need to have specific processing for each of the phases in the lifetime of the corresponding item of digital information.

Lastly, the event log is stored centrally and securely, which makes it possible to meet the requirements of various normative texts to ensure the probative value of each item of digital information.

The invention claimed is:

1. A computer system for secure management of digital information implementing probative value traceability of that digital information, the system being usable in the field of digital archiving, and comprising:
   producing units configured to produce digital information;
   preserving servers for preserving digital information;
   distributing and consuming units configured to distribute and configure digital information;
   units of traceability of digital information including an event log of events relative to digital information and a detector able to detect each event relative to each item of digital information preserved in the preserving server, to record that event in the event log;
   wherein the detector is further able to detect each event relative to each item of digital information during the production thereof by the producing units and during the distribution or consumption thereof by the distributing and consuming units, to record that event in the event log that is shared between the producing units, the preserving servers, and the distributing and consuming units;
   wherein the units of traceability of digital information further include a securing module able to secure the event log; and
   wherein the securing module is able to present the event log in the form of a sequence of computer files, each following computer file comprising a header including an imprint of a preceding computer file and a body including records corresponding to at least certain events detected by the detector.

2. The system according to claim 1, wherein the detector is able to record each event in the event log in a record format shared by all of the events.

3. The system according to claim 1, wherein each event is chosen from the group including:
   creation of an item of digital information;
   modification of an item of digital information;
   deletion of an item of digital information;
   duplication of an item of digital information;
   distribution of an item of digital information; and
   consultation of an item of digital information.

4. The system according to claim 1, wherein the detector assumes the form of three independent detection modules integrated into the producing units, the preserving servers, and the distributing and consuming units.

5. The system according to claim 1, wherein the detector assumes the form of a detection module independent of the producing units, the preserving servers, and the distributing and consuming units.

6. The system according to claim 4, wherein each detection module is made in the form of a software program.

7. The system according to claim 5, wherein the detection module is made in the form of a software program.

8. The system according to claim 1, wherein each item of digital information comprises an electronic document.

* * * * *